United States Patent [19]

Elliott

[11] 4,351,046

[45] Sep. 21, 1982

[54] VIDEO DISC PLAYER HAVING CARRIAGE DETENT MECHANISM

[75] Inventor: Charles A. Elliott, Indianapolis, Ind.

[73] Assignee: RCA Corporation, New York, N.Y.

[21] Appl. No.: 237,873

[22] Filed: Feb. 25, 1981

[51] Int. Cl.³ .............................................. G11B 3/36
[52] U.S. Cl. ..................................... 369/233; 369/77; 369/221; 369/249
[58] Field of Search ................. 369/77, 249, 244, 221, 369/238, 233

[56] References Cited

U.S. PATENT DOCUMENTS 2,508,845  5/1950  Thompson ............................ 369/77
2,670,210  2/1954  Thompson ............................ 369/77
4,285,524  8/1981  Hughes et al. ........................ 369/77

*Primary Examiner*—Steven L. Stephan
*Attorney, Agent, or Firm*—E. M. Whitacre; J. S. Tripoli; D. A. Kulkarni

[57] ABSTRACT

A video disc player is fitted with a mechanism for detenting a stylus carriage against a travel limit stop. The detent mechanism includes a toothed member disposed on the carriage which engages a toothed wheel. The wheel is spring loaded such that in a certain carriage position the spring exerts a force on the carriage through the wheel, which urges the carriage against the limit stop. The detent mechanism impedes possible bounce back of the carriage.

7 Claims, 6 Drawing Figures

VIDEO DISC PLAYER HAVING CARRIAGE DETENT MECHANISM

This invention generally relates to a video disc player, and more particularly, it relates to a mechanism for detenting a pickup carriage at a starting position thereof.

In certain systems, picture and sound signals are stored on a disc record in the form of physical undulations in a continuous spiral track disposed on the record surface. The variations in electrical capacitance between an electrode defined by a record-engaging stylus and a conductive property of the record are sensed as the physical undulations on the record surface pass beneath the stylus tip. The capacitive variations are converted into electrical signals suitable for application to a conventional television receiver. A capacitance-type pickup system is illustratively disclosed in U.S. Pat. No. 3,842,194 (Clemens).

Typically, a video disc record is housed in a protective caddy which comprises an outer jacket and a record retaining spine. The spine is provided with an opening in which a record is received, thereby forming a record/spine assembly. For record loading, a full caddy is manually inserted into the player along a pair of guide rails provided in the player. A record extraction mechanism disposed in the player removes the record/spine assembly from the jacket for retention in the player on a set of receiving pads during subsequent jacket withdrawal. To transfer the record to the turntable for playback, the turntable is raised relative to the receiving pads. The player is provided with hold-down members which hold the spine in place while allowing the record to be picked up by the turntable when it is raised. During playback, the pickup stylus is traversed radially across the record while the turntable revolves the record at the desired speed (e.g., 450 rpm). For record retrieval, the record is transferred back to the receiving pads by lowering the turntable with respect to the receiving pads to redefine the record/spine assembly. An empty jacket is then reinserted into the player, whereby the record/spine assembly is retrieved into the jacket.

Typically, the pickup stylus is disposed at one end of a stylus arm having the other end secured to a protective cartridge by means of a compliant coupler. The compliant coupler allows the stylus to follow the vertical and horizontal movements of the record surface (e.g., warp, eccentricity, etc.). The cartridge is mounted in a carriage having an opening in the bottom wall thereof through which the pickup stylus selectively protrudes for record engagement. During playback, the carriage is translated from a starting position at the back of the player toward the record center so as to follow the radially inward motion of the stylus.

In such systems, it is advantageous to reset the carriage to the starting position during the insertion of a caddy into the player. As an empty caddy is inserted into the loaded player for record retrieval, the front edge thereof engages the carriage to drive it back to a preset limit stop defining the starting position. One type of failure results when the carriage bounces away from the limit stop at the end of its backward travel. This problem is particularly aggravated if the caddy is driven into the player with sufficient force. The caddy, in turn, drives the carriage rapidly against the limit stop, thereby causing it to bounce back.

The carriage detent mechanism, in accordance with the present invention, prevents the carriage from bouncing back. The subject mechanism includes a member subject to engagement with the carriage during its motion toward the preset limit stop. A spring coupled to the member stores energy which exerts a force on the carriage in a direction that biases the carriage against the limit stop when the carriage arrives within a specified distance from the stop.

Figure 1:
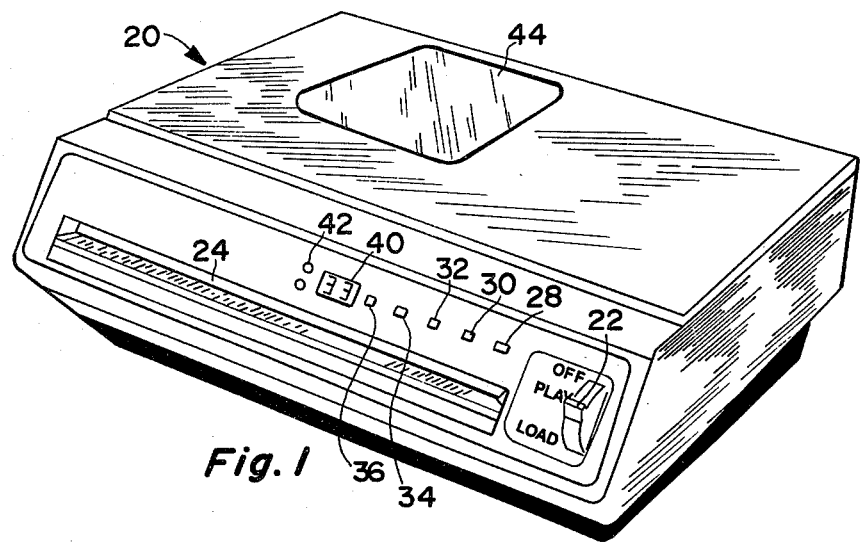
FIG. 1 is a video disc player incorporating a carriage detent mechanism in accordance with the instant invention.

Shown in FIG. 1 is a video disc player 20 incorporating the present carriage detent mechanism. A function lever 22 on the front side of the player is subject to disposition in any one of three positions—OFF, PLAY and LOAD/UNLOAD. A caddy entry door closes a caddy input slot 24 when the function lever 22 is disposed in the OFF and PLAY positions. In the LOAD/UNLOAD position of the function lever 22, the caddy entry door is opened to permit insertion of a full video disc caddy 26, shown in FIG. 2, into the player to load an enclosed record therein. A pushbutton 28 is provided to dispose the player in the "PAUSE" mode to allow the viewer to interrupt the program for as long as desired without missing any of the program content. A set of pushbuttons 30, 32, 34 and 36 are arranged on the instrument panel 38 to dispose the player in any one of four "SEARCH" modes, i.e., rapid access (forward/reverse) and visual search (forward/reverse), to permit the viewer to quickly locate a precise section of the program. A digital LED readout 40 provides an indication of playing time and other functions, such as PAUSE, LOAD/UNLOAD and END-OF-PLAY, etc. A pair of tally lights 42 are operated to provide an indication of the record side subject to play, e.g., "SIDE 1" and "SIDE 2". A removable door 44 is disposed on the cover of the player to provide access to a stylus cartridge 46, shown in FIG. 3, so that it can be changed when required.

Figure 2:
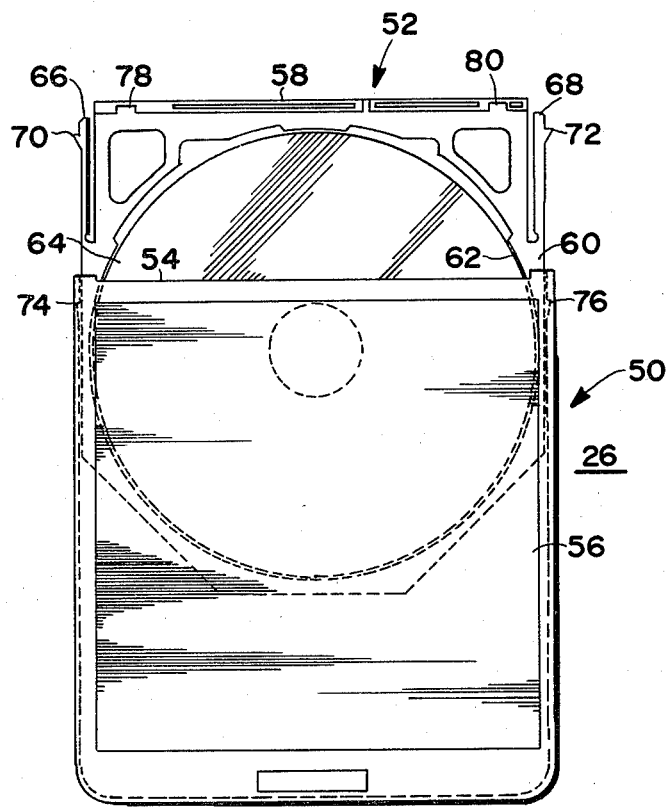
FIG. 2 shows a video disc caddy suitable for use with the subject invention in the player of FIG. 1.

As shown in FIG. 2, the video disc caddy 26 comprises a jacket 50 and a record retaining spine 52. The jacket 50 has an edge opening 54 in communication with a cavity 56 for enclosing a record/spine assembly. The spine 52 has a portion 58 which serves as a closure, and a further portion 60 having a circular opening 62 for receiving a centrally-apertured record 64. The spine 52 is further fitted with integrally-molded, flexural latch fingers 66 and 68. Each of the spine latch fingers 66 and 68 has a protruding element 70 and 72. The protruding elements 70 and 72 are received in pockets 74 and 76 disposed in the jacket 50 for capturing the spine 52 when it is fully seated therein. The spine 52 is provided with cutouts 78 and 80 for selectively receiving a pair of spine gripper members mounted in the player to secure the spine thereto in the manner explained later.

Figure 3:
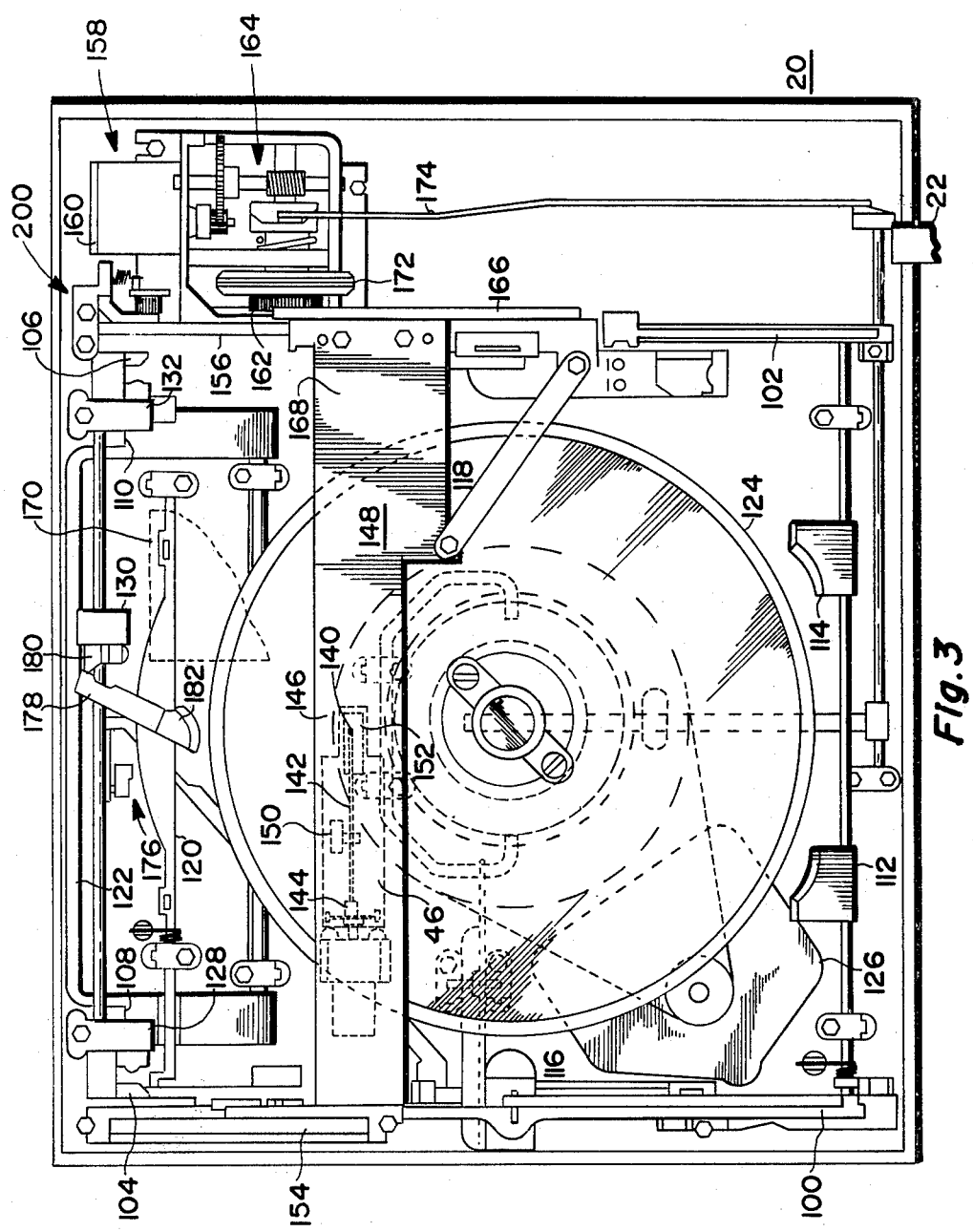
FIG. 3 represents a plan view of the player of FIG. 1 with its cover removed to show the underlying details.

The operation of a record loading/unloading mechanism provided in the player will first be explained in conjunction with FIG. 3. To insert a record, a loaded caddy 26 is guided into the input slot 24 along a path defined by side rails 100 and 102. As the caddy arrives at a fully inserted position in the player, latch defeat members 104 and 106 enter the jacket 50 to defeat the spine latch fingers 66 and 68 for freeing the spine 52 from the jacket. Pivotally mounted in the player are spine gripper members 108 and 110 which are received in the respective cutouts 78 and 80, arranged in the spine 52, when the caddy arrives at the fully inserted position in the player in order to lock the spine to the player. Since the spine 52 is released from the jacket 50 through the operation of the latch defeat members 104 and 106 and is latched to the player through the operation of the spine gripper members 108 and 110, subsequent withdrawal of the jacket leaves the record/spine assembly in the player. The retained record/spine assembly is supported on a set of depressible receiving pads 112, 114, 116, 118 and 120. A pair of springs (not shown) disposed between a gripper arm 122, which carries the spine gripper members 108 and 110, and the latch defeat members 104 and 106 effect downward deflection of the latch defeat members upon jacket withdrawal.

To transfer the retained record to a turntable 124, the function lever 22 is displaced to the PLAY position, which, in turn, raises the turntable and starts a turntable motor 126. A set of hold-down members 128, 130 and 132 hold the retained spine 52 in place against the receiving pads 112, 114, 116, 118 and 120 while permitting the retained record to be intercepted by the turntable 124 when it is raised. The hold-down members 128, 130 and 132 also serve to accurately locate the retained spine 52, longitudinally and laterally, in the player.

A pickup stylus 140 is disposed at one end of a stylus arm 142, the other end of which is suspended in the cartridge 46 by means of a flexible rubber coupler 144. The cartridge 46 is placed in a compartment 146 provided in a stylus arm carriage 148, and the carriage lid, not shown, is closed.

A stylus arm lifting/lowering mechanism 150 is mounted in the carriage 148 to selectively lower the pickup stylus 140 through an opening 152 provided in the bottom wall of the carriage to effect record engagement. During playback, the carriage 148 is translated on guide ways 154 and 156 disposed parallel to the caddy side rails 100 and 102 from a starting position at the back of the player toward the front of the player in synchronism with the radially inward motion of the pickup stylus 140. The carriage drive mechanism 158 comprises a servo-controlled motor 160 which drives a pinion 162 through a gear train 164. The pinion 162 engages a rack 166 secured to the underside of the carriage 148 to translate the carriage along the guide ways 154 and 156 in such a way as to keep the pickup stylus 140 centered in the cartridge 46.

During playback, the variations in electrical capacitance between an electrode carried by the stylus 140 and a conductive property of the record 64, in correspondence to the rises and falls of the disc surface under the stylus end, are sensed by pickup circuitry 168 to reproduce the stored information on the record. The recovered signals are processed by signal processing circuits 170 to reconstruct a television signal containing picture and sound information for application to a television receiver.

To transfer the record back to the receiving pads 112, 114, 116, 118 and 120 after playback, the function lever 22 is depressed to the LOAD/UNLOAD position, which, in turn, lowers the turntable 124 to a level below the receiving pads. When the turntable 124 is lowered, the record is deposited on the receiving pads 112, 114, 116, 118 and 120 for reception in the opening 62 disposed in the spine 52 to redefine the record/spine assembly. The turntable motor 126 is shut off when the function lever 22 is displaced to the LOAD/UNLOAD position. The location of the receiving pads 112, 114, 116, 118 and 120, occupying the raised position thereof, is such that the record/spine assembly is aligned with the center line of the caddy side rails 100 and 102.

To retrieve the record/spine assembly, the empty jacket 50 is inserted into the player through the input slot 24 along the caddy side rails 100 and 102. As the jacket 50 arrives at the fully inserted position, the front edge thereof engages the carriage 148 to push it back to the starting position at the back of the player, and it also engages the already deflected latch defeat members 104 and 106 to cause further downward deflection thereof. Such further downward deflection of the latch defeat members 104 and 106, in turn, effects downward displacement of the spine gripper members 108 and 110, whereby the spine 52 is freed from the player. When the jacket 50 is fully inserted into the player, the protruding elements 70 and 72 of the spine latch fingers 66 and 68 snap back into the pockets 74 and 76 to lock the spine 52 to the jacket. The record/spine assembly is withdrawn from the player when the caddy is extracted.

To facilitate restoration of the carriage 148 to its starting position when an empty caddy is inserted into the loaded player for record retrieval, a selectively actuated clutch 172 is interposed between the pinion 162 and the gear train 164 to disconnect the carriage from its drive mechanism 158 during the caddy insertion. The function lever 22 acts upon the clutch 172 through a lever 174 when the player is disposed in the LOAD/UNLOAD mode to free the carriage 148 from any hindrance by the carriage drive mechanism 158.

The player is fitted with a stylus cleaner mechanism 176 at the back of the player to selectively clean the pickup stylus 140. When a full caddy is inserted into the player to load a record therein, the front edge of the caddy pushes a cleaner arm 178 back. The cleaner arm 178 is held in the retracted position by the spine 52 which is latched to the player. To retrieve the record/spine assembly, an empty jacket is inserted into the player as indicated hereinbefore. As the loaded caddy is extracted from the player, the cleaner arm 178 follows the motion of the caddy until it is arrested by a latch plate 180. As the loaded caddy is further withdrawn from the player, the stylus lifter 150 momentarily lowers the pickup stylus 140 onto a cleaning pad 182 disposed on the cleaner arm 178, and the latch plate 180 then releases the cleaner arm 178 to return to its rest position to effect wiping of the stylus. U.S. Pat. application, Ser. No. 122,959, filed for L. M. Hughes, describes the stylus cleaning mechanism in more detail.

Figure 4:
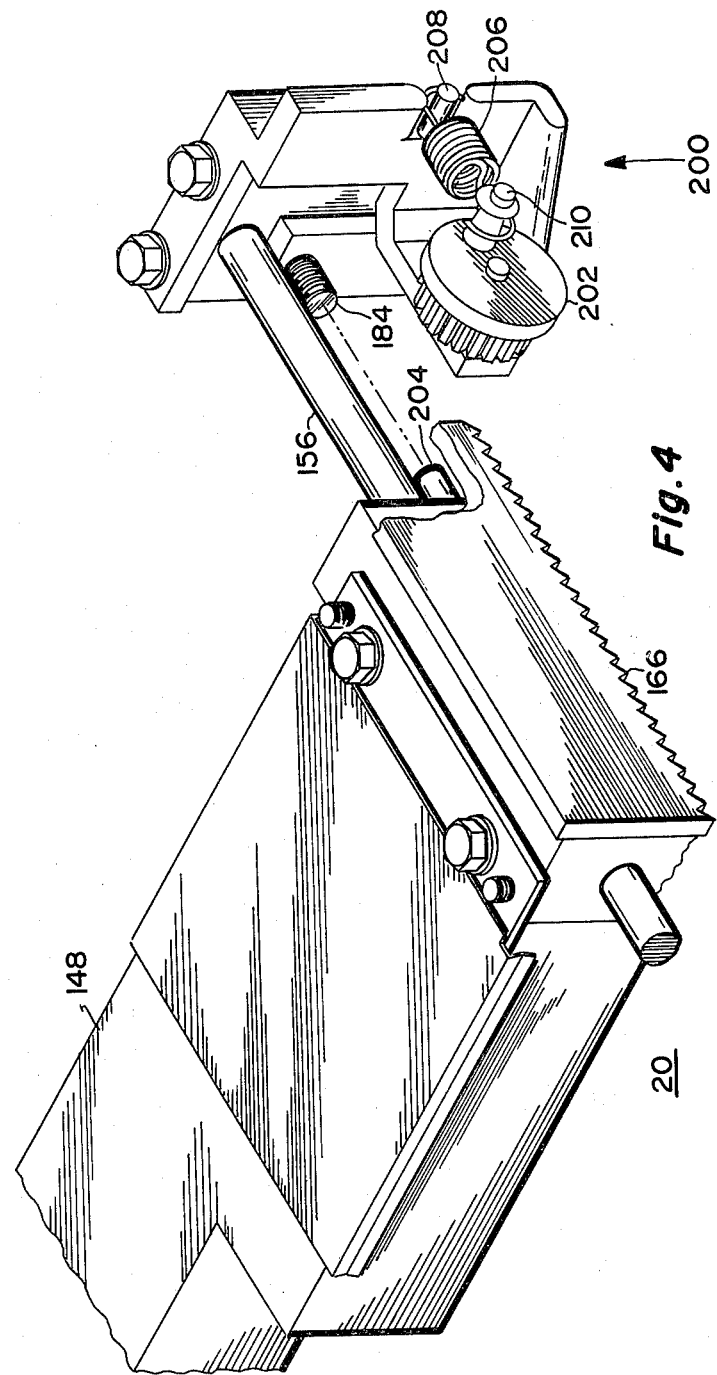
FIG. 4 depicts a perspective view of the present carriage detent mechanism.
Figure 5:
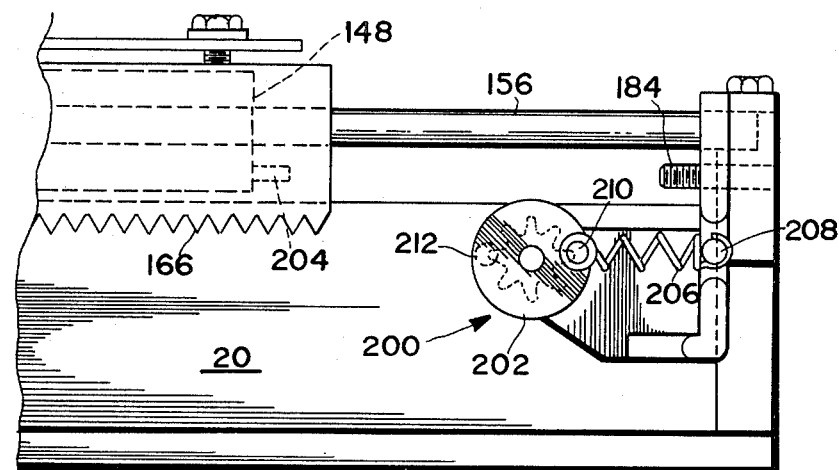
FIGS. 5 and 6 are side views of the subject carriage detent mechanism of FIG. 4 illustrating an operating sequence.
Figure 6:
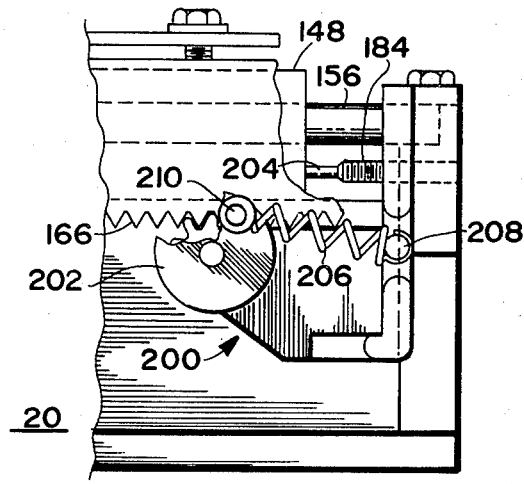

As hereinbefore indicated, one type of failure mode occurs if the pickup carriage 148 bounces forward, away from a preset limit stop 184, shown in FIGS. 4–6, and defining the desirable starting position of the carriage. The bounce back condition is aggravated when the caddy is driven into the player with sufficiently great force. For example, when the carriage 148 bounces forward, the pickup stylus 140 may be lowered in front of the cleaning pad 182, rather than being lowered onto it, and the stylus may then get damaged as the cleaner arm 178 swings back to its rest position. It is, therefore, desirable to ensure that the carriage 148 is consistently reset at its starting position.

The carriage detent mechanism 200, pursuant to the subject invention, prevents the carriage 148 from bouncing back. The subject mechanism 200, illustrated in FIGS. 4-6, comprises a toothed spur gear 202 disposed in the path of the carriage 148 such that the rack 166 mounted to the underside of the carriage engages the gear, as the carriage moves toward the limit stop 184, to cause rotation thereof from a first position shown in FIG. 5, when the rack initially engages the gear, to a second position shown in FIG. 6, when a pin 204 disposed on the carriage is against the preset limit stop. A spring 206 is disposed between a pin 208 fixedly secured to the player and a pin 210 eccentrically disposed on the gear 202. From FIG. 6, it will be seen that the spring 206 biases the carriage 148 against the limit stop 184.

As the gear 202 is rotated, under the load of the spring 206, from the first position, depicted in FIG. 5, to the second position, represented in FIG. 6, the offset pin 210 goes beyond its over-the-center position 212, indicated in FIG. 5, to reverse the direction of force exerted by the spring on the gear, whereby the carriage is urged toward the limit stop 184.

A feature of the present invention is that when the carriage 148 arrives within a specified distance from the limit stop 184, as the caddy 26 drives the carriage back to its starting position, the carriage is suddenly pulled toward the stop by the spring 206, thereby decreasing the resistance offered by the carriage to the caddy insertion. Sudden change in the force experienced by the user provides him an indication of the arrival of the caddy at its fully inserted position in the player.

When the player is disposed in the PLAY mode, the carriage drive motor 160 drives the carriage 148 away from the limit stop 184 against the force exerted by the spring-loaded spur gear 202 and in synchronism with the motion of the stylus toward the record center. As the carriage 148 is translated away from the stop 184, the spring-loaded gear 202 returns to its first position illustrated in FIGS. 4 and 5.

What is claimed is:

1. In a player for recovering prerecorded signals from a disc record by means of a signal pickup housed in a translatable carriage; said player being equipped with a stop to limit the travel of said carriage in a first direction; a detent apparatus comprising:
   means subject to engagement with said carriage during motion of said carriage toward said limit stop; and
   yieldable means responsive to said engagement for storing energy; said yieldable energy storing means exerting a force on said engagement means in a direction such that said carriage is urged toward said limit stop when said carriage is disposed within a given distance from said stop.

2. Apparatus as defined in claim 1 wherein said engagement means comprises a pulley disposed in the path of said carriage such that said carriage engages said pulley to cause rotation thereof in said first direction as said carriage is translated toward said limit stop.

3. Apparatus as defined in claim 2 wherein said yieldable energy storing means comprises a spring with one end secured to a fixed point in said player, and having the other end secured to a point eccentrically disposed on said pulley; said pulley being located and dimensioned such that said eccentric point goes beyond a given plane during said rotation of said pulley to cause said pulley to urge said carriage in said first direction against said limit stop upon arrival of said carriage at said stop.

4. Apparatus as defined in claim 3 for use with said player wherein a toothed member is mounted to said carriage; wherein said pulley has teeth disposed about the periphery thereof for engagement with said carriage-mounted toothed member to bring about said rotation of said pulley.

5. Apparatus as defined in claim 4 for use with said player wherein said record is removably enclosed in a protective cover; wherein a full cover is inserted into said player in said first direction to load an enclosed record therein; wherein an empty cover is reinserted into said player to retrieve said record into said cover; said carriage being driven in a second direction away from said stop during playback; wherein said empty cover engages said carriage as it is inserted into said player for record retrieval to reset said carriage against said limit stop.

6. Apparatus as defined in claim 5 wherein said spring exerts a force on said carriage in a direction away from said limit stop as said carriage effects the rotation of said pulley until said eccentric point goes beyond said given plane; wherein the direction of said force exerted on said carriage by said spring is reversed as said eccentric point goes beyond said plane to bias said carriage toward said limit stop.

7. In a player for recovering prerecorded signals from a disc record by means of a singal pickup housed in a translatable carriage; said player being equipped with a mechanism to limit the travel of said carriage in a first direction; apparatus comprising:
   first means subject to engagement with said carriage during motion of said carriage toward said mechanism; and
   second means responsive to said engagement of said first means with said carriage exerting a force on said first means in a direction such that said carriage is urged towards said mechanism, whereby motion of said carriage in a direction opposite to said first direction is impeded.

* * * * *